J. CLEGG.
SIRUP-PANS.

No. 181,644.  Patented Aug. 29, 1876.

WITNESSES:  INVENTOR:

UNITED STATES PATENT OFFICE.

JAMES CLEGG, OF ALMOND, ALABAMA.

IMPROVEMENT IN SIRUP-PANS.

Specification forming part of Letters Patent No. 181,644, dated August 29, 1876; application filed May 1, 1874.

*To all whom it may concern:*

Be it known that I, JAMES CLEGG, of Almond, in the county of Randolph and State of Alabama, have invented a new and useful Improvement in Sirup-Pans, of which the following is a specification:

In boiling juice for making sirup the scum rises rapidly, and contains a large percentage of the juice, and as the boiling juice is exposed to a gradually-increasing temperature during its forward motion in the pan, the scum boils over the pan-partitions until it reaches the finishing end, whence it is either skimmed off or is returned to the commencing-point.

To facilitate the working forward of the scum in connection with the forward motion of the juice, I have combined, with a circuitous passage for the sirup in the pan, partitions which increase in height in regular gradations from front to rear, so that the co-operation of the graded partitions with the uninterrupted passage in the pan produces the best effect in preventing the scum from crowding at the discharging end, and saves a large amount of labor which would be required to remove it from the finishing-space, and enables me to make a better quality and a greater yield of sirup than with partitions of uniform height in connection with the circuitous passage for the sirup formed by the alternate partition-spaces.

Graded partitions have been used in connection with outside cocks for effecting the communication of the compartments, and in which a pump has been employed for charging the sirup from any one of the compartments to another, and, as stated, the circuitous passage between the partitions has been used with partitions of equal height; but these plans lack the advantages separately which I obtain by their conjoint co operation, each assisting the other in obtaining the best results and advantages not enhanced by the old plans.

Figure 1:
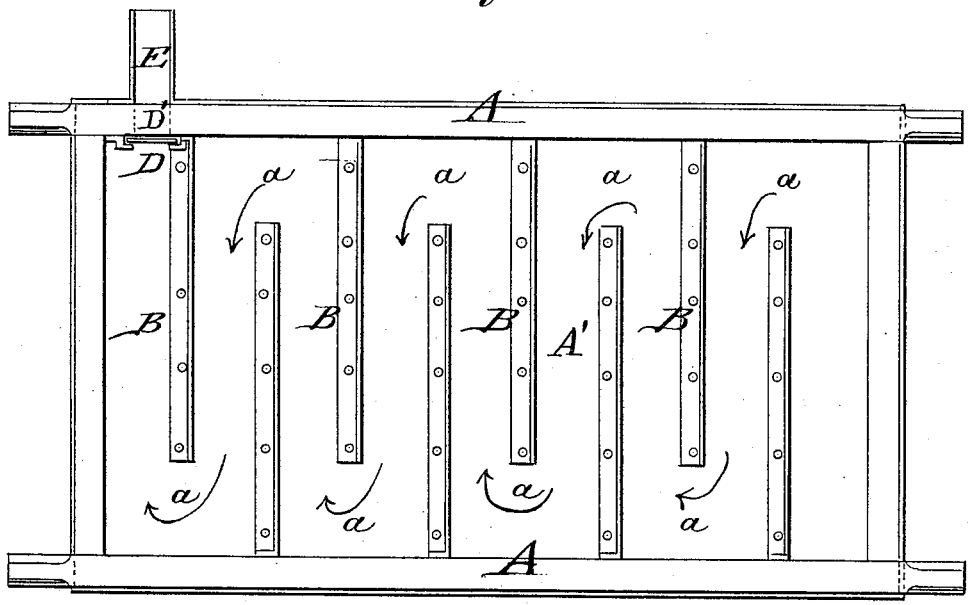
Figure 2:
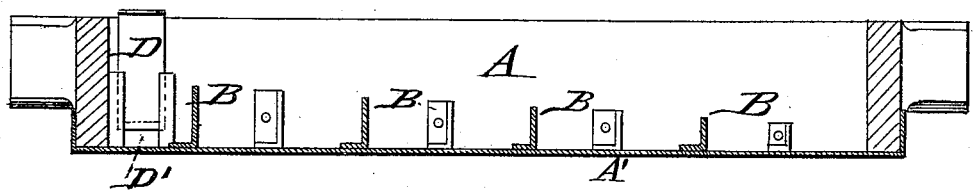
Figure 3:
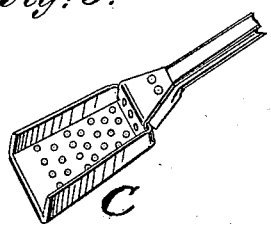

In the accompanying drawings, Figure 1 represents a top view of my improved sirup-pan; Fig. 2, a longitudinal section thereof; Fig. 3, the scum-skimmer.

The pan has the usual side bars A and metal bottom A', to which the dividing-strips B are riveted, so as to leave the bottom smooth and give an unbroken even sheet of flame beneath the same. The strips B are riveted to the bottom, so as to leave the usual alternate spaces *a* for the flow of the sirup transversely from front to rear. These partitions, however, instead of being of equal height, increase in regular gradations from the front to the rear, the first (or partition of least height) being about one inch, the next an inch and a half, and so on to the finishing-space, so that the top portion of the scum which rises quickly will flow unobstructed over the tops of the partitions from the point of the least boiling to the point of the greatest boiling, and then return without obstruction over the decreasing partitions, so as to obtain the best effect in getting the largest quantity of sirup from the scum in its back-and-forth course over the partitions, as before stated.

In boiling over one partition after another the scum finally separates, and floats back to the juice of the lowest temperature, where it is gathered off by the perforated skimmer. A gate, D, at the rear end of the pan may be raised and lowered over the opening D' of the pan to let out the finished sirup through a spout, E, at the side of the pan.

By raising and lowering the gate, sirup of lesser or greater consistency is obtained, as the lower the gate is set the longer the sirup will be exposed to evaporation, until boiled down to the required thickness.

The juice is introduced into the space having the partition of the least height, and the scum boils over from one partition to the other, and passes forward over partitions which form a gradual upward incline plane, with the results before stated, while the sirup passes in its course around and through the spaces formed between the ends of the partitions and the side bars of the pan.

The feature of invention claimed in this patent is shown and described, but not specifically claimed, in a patent granted to me February 8, 1876, No. 173,270; but the application upon which this patent was granted having been filed May 1, 1874, and pending at the time of the grant of my said first patent, such feature of invention can only of right be claimed herein.

I claim—

The combination, with the partitions having an increasing height in regular gradations from the front to the rear of the pan, of the side passages $a$, whereby the varying depths of the partitions co-operate with the side spaces to obtain the advantages set forth.

JAMES CLEGG, M. D.

Witnesses:
 ALMOND P. HUNTER,
 BENJAMIN F. JOHNSON.